(12) United States Patent
Ryan, Jr.

(10) Patent No.: US 6,473,743 B1
(45) Date of Patent: Oct. 29, 2002

(54) POSTAGE METER HAVING DELAYED GENERATION OF CRYPTOGRAPHIC SECURITY PARAMETERS

(75) Inventor: Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/474,910

(22) Filed: Dec. 28, 1999

(51) Int. Cl.[7] .............................................. G06F 17/60
(52) U.S. Cl. ........................... 705/60; 705/71; 705/410; 380/277; 380/278; 380/282; 380/44; 713/171
(58) Field of Search .............................. 705/60, 61, 62, 705/71, 403, 405, 410; 713/155, 171

(56) References Cited

U.S. PATENT DOCUMENTS

| | | | | |
|---|---|---|---|---|
| 4,972,472 A | * | 11/1990 | Brown et al. .................. | 380/21 |
| 5,680,456 A | * | 10/1997 | Baker et al. ................... | 380/21 |
| 5,712,800 A | * | 1/1998 | Aucsmith ..................... | 380/30 |
| 5,761,306 A | * | 6/1998 | Lewis .......................... | 380/21 |
| 5,768,389 A | * | 6/1998 | Ishii ............................. | 380/30 |
| 5,805,701 A | * | 9/1998 | Ryan, Jr. ..................... | 380/21 |
| 5,812,666 A | * | 9/1998 | Baker et al. ................... | 380/21 |
| 5,878,136 A | * | 3/1999 | Kim et al. .................... | 380/21 |
| 6,041,317 A | * | 3/2000 | Brookner ..................... | 705/61 |
| 6,058,478 A | * | 5/2000 | Davis .......................... | 713/191 |
| 6,169,803 B1 | * | 1/2001 | Sako et al. .................... | 380/44 |
| 6,240,187 B1 | * | 5/2001 | Lewis .......................... | 380/282 |
| 6,289,454 B1 | * | 9/2001 | Eslinger et al. ............. | 713/189 |
| 6,295,359 B1 | * | 9/2001 | Cordery ....................... | 380/44 |
| 6,317,498 B1 | * | 11/2001 | Pastor et al. .................. | 380/51 |
| 6,367,011 B1 | * | 4/2002 | Lee et al. .................... | 713/172 |

FOREIGN PATENT DOCUMENTS

| | | | |
|---|---|---|---|
| EP | 0 202 768 A2 | * | 4/1986 |
| EP | 0 750 410 A2 | * | 6/1996 |
| WO | WO 99/64996 | * | 12/1999 |
| WO | WO 00/74298 | * | 12/2000 |

OTHER PUBLICATIONS

Lane, Alex, "Cyber–Privacy: In Cyberspace, the Wall Have Ears", Computer Shopper, vol. 14, No. 9, Sep. 1994.*
Anonymous, "Cylink: Cylink Uses Strong Keys to Lock Desktop Data With SecureNode Information Security System", Press Release, Dialog File 810:Business Wire, Mar. 28, 1996.*
Foroozesh, Mehrdad, "Protecting Your Data With Cryptography", UNIX Review, vol. 14, No. 12 , Nov. 1996.*
Toigo, Jon William, "Use Trusted Third Parties to Secure Data", Databased Web Advisor, vol. 15, No. 7, p. 52, Jul. 1997.*
Anonymous, "Encryption in Popular E–Mail Software", Internal Auditor, vol. 55, No. 6, pp 28–29, Dec. 1998.*
Cravotta, Nicholas, "Accelerating High–Speed Encryption: One Bottleneck After Another", EDN, vol. 46, No. 18, Aug. 16, 2001.*

* cited by examiner

Primary Examiner—James P. Trammell
Assistant Examiner—John W. Hayes
(74) Attorney, Agent, or Firm—Steven J. Shapiro; Angelo N. Chaclas

(57) ABSTRACT

A method for using cryptographic parameters in a postage meter for securing postage indicium data includes the steps of generating in the postage meter 1) first cryptographic parameters which are useable in conjunction with second cryptographic parameters by the postage meter to cryptographically secure postage indicium data and 2) a cryptographic key; storing the first cryptographic parameters but not the second cryptographic parameters in the postage meter during the registering of the cryptographic key with a certificate authority; receiving at the postage meter notification that the cryptographic key has been registered with the certificate authority; and subsequent to receiving the notification generating and storing the second cryptographic parameters in the postage meter such that the first and second cryptographic parameters are stored in the postage meter for use in cryptographically securing postage indicium data.

8 Claims, 2 Drawing Sheets

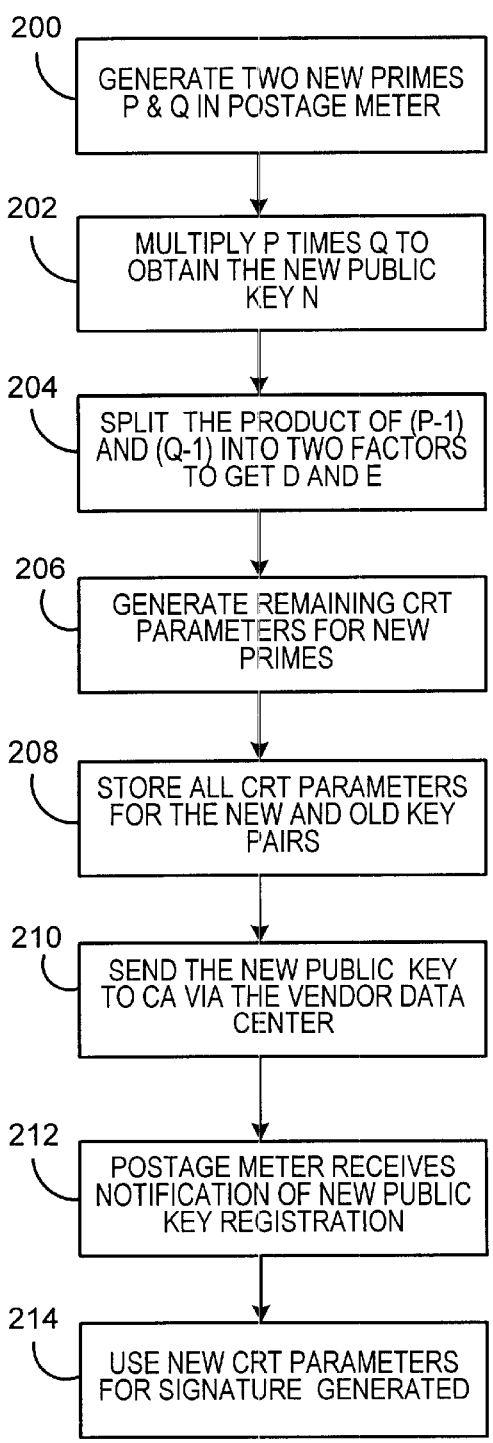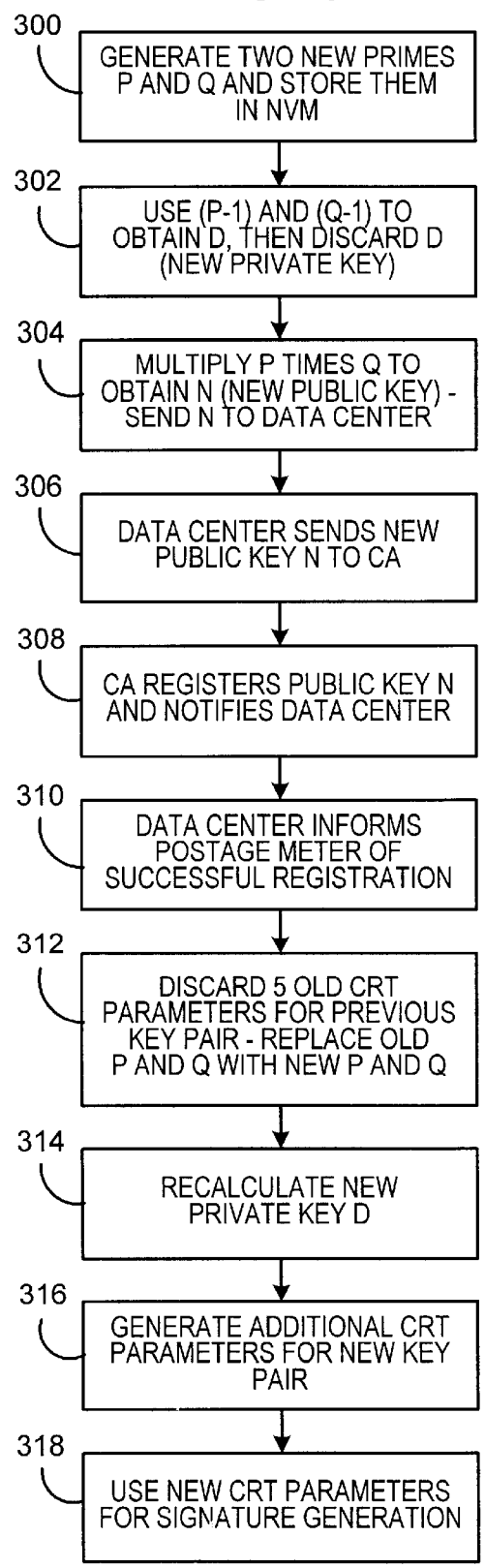

POSTAGE METER HAVING DELAYED GENERATION OF CRYPTOGRAPHIC SECURITY PARAMETERS

FIELD OF THE INVENTION

The invention disclosed herein relates generally to metering systems that generate keys for use in producing cryptographically secure information. More particularly, this invention is directed to metering systems that delay generation of meter security parameters that are associated with cryptographic keys in order to lessen memory burden on the metering system.

BACKGROUND OF THE INVENTION

Postage meters are conventional devices that are used to print an indication of dispensed postage value on a mailpiece. The indication of dispensed postage value is typically in the form of a postage indicium and may include, in addition to the postage value, a date and/or time the postage indicium was printed, a meter serial number, a mailed from zip code, and cryptographically secure data that can be used by the postal authority to verify the authenticity of the postage indicium. The cryptographically secure data is calculated by the metering system using keys that are generated by the metering system. Accordingly in order for the postage indicium to be verified, the party performing the verification must have the capability of obtaining the metering system key (secret key system) or a corresponding public key (public key system).

The United States Postal Service (USPS) has developed draft specifications based on a public key system for the generation of cryptographically secure postage indicium that can be verified as being authentic. These specifications require that a postage meter generate its own public/private key pair. This key pair must be changed periodically and the newly generated public key registered with the USPS. Unfortunately, the newly generated private and public keys cannot be used by the postage meter until the new public key is registered with a certificate authority (i.e. the USPS or its designated certificate authority). However, the registration process does not occur in real time. As a result, a postage meter must maintain the cryptographic parameters for two key pairs during the period of time from when a new key pair has been generated until notification of successful registration of the new public key has been received at the postage meter. Where postage meter vaults using smart card chips are used (for example in either low cost or portable vault applications), an extra burden is placed on the smart card chip by requiring additional non-volatile memory (which is at a premium in smart card chip and similar devices) for the storage of two sets of cryptographic parameters. Accordingly, there is a need for a method and associated apparatus that lessens the memory burden on the vault structure while accommodating the process for registering newly generated keys.

SUMMARY OF THE INVENTION

The present invention overcomes the problems discussed above in connection with conventional postage metering systems by providing a method for using cryptographic parameters in a postage meter for securing postage indicium data that includes the steps of generating in the postage meter 1) first cryptographic parameters which are useable in conjunction with second cryptographic parameters by the postage meter to cryptographically secure postage indicium data and 2) a cryptographic key; storing the first cryptographic parameters but not the second cryptographic parameters in the postage meter during the registering of the cryptographic key with a certificate authority; receiving at the postage meter notification that the cryptographic key has been registered with the certificate authority; and subsequent to receiving the notification generating and storing the second cryptographic parameters in the postage meter such that the first and second cryptographic parameters are both stored in the postage meter for use in cryptographically securing postage indicium data.

DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which:

FIG. 2 is a flowchart showing a first cryptographic key registration process; and FIG. 3 is a flowchart showing a second cryptographic key registration process.

DETAILED DESCRIPTION OF THE PRESENT INVENTION

Figure 1:
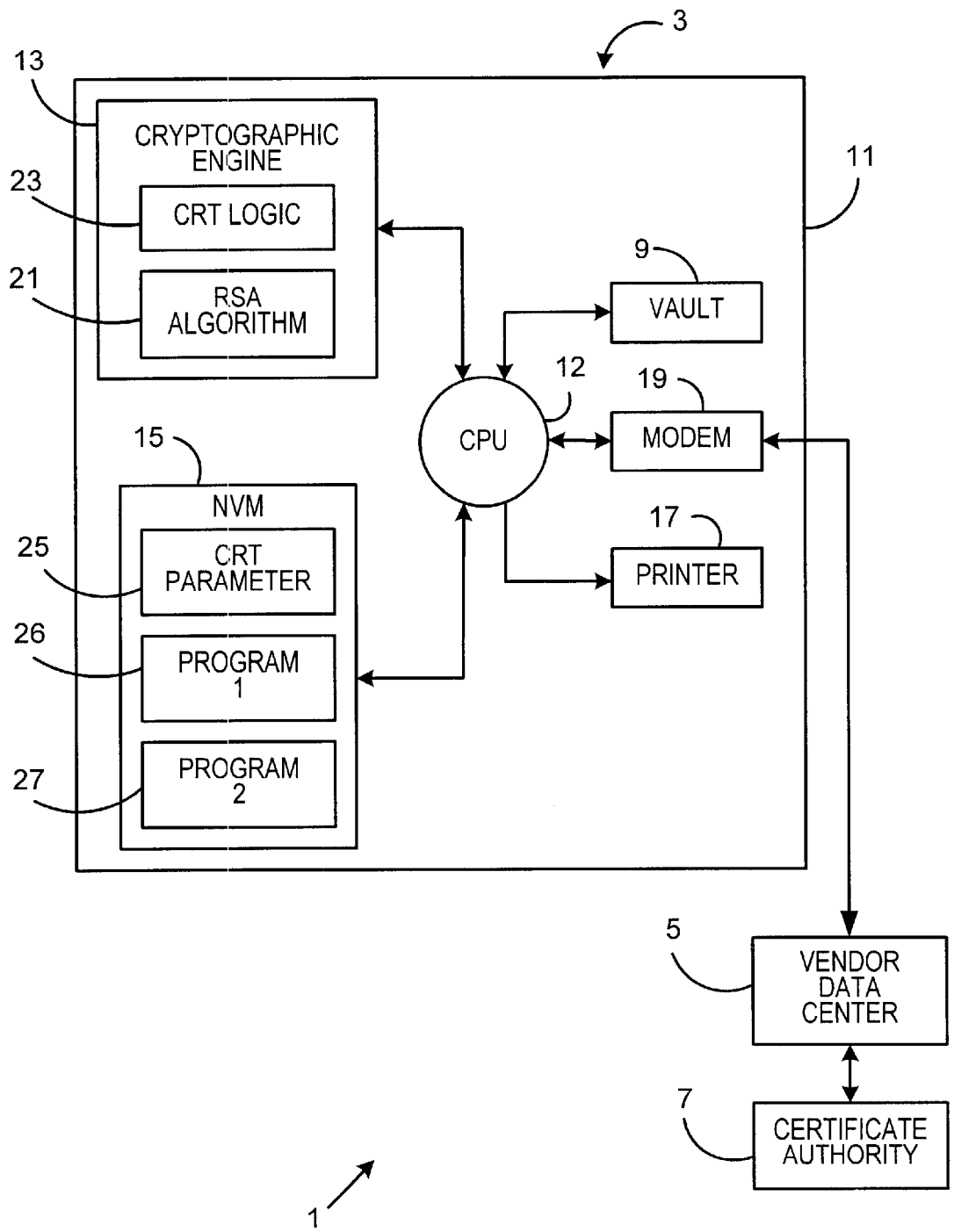
FIG. 1 is a drawing of a postage metering system incorporating the instant invention.

Referring to FIG. 1, a postage metering system 1 incorporating the claimed invention is shown. The postage metering system 1 includes a postage meter 3, a vendor data center 5, and a certificate authority 7. The postage meter 3 is shown as a conventional postage meter having a vault 9 that accounts for the value of postage dispensed and contained within a closed housing 11. However, the instant invention is equally applicable to a Personal Computer(PC) Meter which uses a portable vault that is coupled to a PC as described in U.S. Pat. No. 5,742,683 which issued Apr. 21, 1998 and which is incorporated herein by reference. Additionally, the postage meter 3 includes a central processing unit (CPU) 12 for implementation of the functions of the postage meter described herein, cryptographic engine 13, non-volatile memory 15, a printer 17 that prints the cryptographically secure postage indicium, and a modem 19 for electronic communication with remote devices such as vendor data center 5.

Cryptographic engine 13 includes a cryptographic algorithm 21 (which in the preferred embodiment is "RSA") as well as the Chinese Remainder Theorem (CRT) logic 23. The RSA algorithm 21 is used in combination with the CRT logic 23 and known postal data elements in order to optimize calculation of an RSA signature. The RSA signature is included in the postage indicium and used by the postal authority to verify the authenticity of the postage indicium. By using the CRT logic 23, the size of the operands required for the large integer arithmetic required by RSA in generating the digital signature is effectively cut in half. This allows designers to build smaller and faster coprocessors. However, when using the CRT logic 23 there are a number of CRT parameters 25 which must be stored in non-volatile memory 15 for each public and private key pair that are generated by the cryptographic engine 13. The parameters 25 are used each time an RSA signature is generated by cryptographic engine 13.

Referring to FIG. 2, a first process (implemented using programs stored at 26) for key and parameter 25 generation using the RSA algorithm 21 and CRT logic 23 is described as follows:

(Step 200)—Two new primes, P and Q, are generated within the cryptographic engine 13 (each 64 bytes for the USPS draft specification implementation) (Step 202)—The new P and Q are multiplied to obtain the modulus (a.k.a. the public key) N=P*Q (Step 204)— The product of (P−1) and (Q−1) is then split into two factors in a conventional manner to produce: D (a.k.a. the private key) and E. E is defined for implementation of the USPS draft specifications as 65537 for performance reasons. (Step 206)—The CRT parameters are then generated from P, Q, and D as follows:

P=P
Q=Q
ExpDP=D mod (P−1)
ExpDQ=D mod (Q−1)
InverseQ=Q$^{-1}$ mod P

Once the values of the CRT parameters 25 are generated, they are all (each 64 bytes for USPS draft specification implementation) stored in non-volatile memory 15 of the postage meter (Step 208) together with all five CRT parameters for the immediately preceding P and Q associated with the current key pair. At Step 210 the new public key N is sent via the data center 5 to the CA 7 for registration. At Step 212 the Postage metering system 1 receives notice of registration of the new public key. At this point in time the five new CRT parameters are used by the cryptographic engine 13 when generating the RSA signature instead of the previously generated CRT parameters (Step 214). It is to be noted that in using the CRT technique the private key D does not need to be stored once the CRT parameters 25 have been generated.

The USPS draft specifications require that a postage meter generate a new private and public key pair at least every three years. As previously mentioned, the public key N must be registered prior to its use with the USPS Certification Authority 7 by the meter vendor data center 5. Unfortunately, this process cannot be performed in "real-time" as of this date (it is also prudent to design a system which assumes that this registration will never take place in real-time in order to account for inevitable down time and overloads on the Certificate Authority 7). Therefore, under the key registration scheme of FIG. 2 the postage meter 3 must store, as described above, a separate set of CRT parameter data 25 for each of the public key pairs during the period of time it takes to register the new public key with the certificate authority 7. This is because until the new public key is registered, the CRT parameters 25 associated with the old public key pair will be used to produce the cryptographically secure postage indicium. Accordingly, under the existing key generation scheme, 640 bytes of non-volatile memory is required to store both sets of CRT parameter data 25. By requiring the dedication of this amount of non-volatile memory in devices such as smart card chips (which commonly have between 2K and 8K of NVM) for CRT parameter storage, the use of critical non-volatile memory for other uses, such as application code and transaction history, is significantly reduced.

Reference is now made to FIG. 3 and the description below which illustrates the inventive method for overcoming the disadvantages associated with the method described in connection with FIG. 2 above. The method of FIG. 3 is implemented by programs stored in NVM 15 and shown in dashed lines at 27 in lieu of the programs 26 and is described as follows:

(Step 300)—When a new key pair is required to be generated by the postage meter 3, the cryptographic engine 21 generates two new primes, P and Q, and stores them in NVM 23.

(Step 302)—The cryptographic engine 21 generates a new private key D as previously described to ensure that one exists for the new primes P and Q (E is a fixed value as defined above). D is then discarded and need not be stored. (This step is required because there are values of D that are not acceptable. If such a value is generated, the process would return to step 300 to generate a two new primes.)

(Step 304)—The new P and Q values are multiplied to obtain a new public key, N, which is sent to the vendor data center 5 via the modem 19 and not stored in the postage meter 3.

(Step 306)—The vendor data center 5 sends the new public key N to the USPS CA 7 for registration.

(Step 308)—The CA 7 registers the new public key N and informs the vendor data center 5 that registration has been completed.

(Step 310)—The vendor data center 5 then informs the postage meter 3 that its new public key N has been successfully registered.

(Step 312)—The postage meter 3 then discards the stored five old CRT parameters 25 associated with the previous key pair and replaces the old stored P and Q with the new P and Q generated in step 300 above.

(Step 314)—The postage meter 3 then recalculates the new D in the manner described in step 302 from the new P and Q, and E.

(Step 316)—The postage meter 3 then generates the remaining new CRT parameters (ExpDP, ExpDQ and InverseQ) using the new P and 0, and E values and stores them in non-volatile memory 23 together with the new P and Q values to form a new set of CRT parameters 25.

(Step 318)—Use the new CRT parameters for signature generation.

By employing the method described in connection with FIG. 3, it is not necessary for the postage meter 3 to store five CRT parameters for the old P and Q values as well as for the new P and Q (total of 10 CRT parameters using 640 bytes of NVM 23) while the new public key N is being registered at the USPS CA 7, as was the case described in FIG. 2. Rather, the method of FIG. 3 requires only the new P and Q values to be stored together with the five old CRT parameters in NVM 23 during the registration of the new public key N at the CA 7. As a result, only 128 additional bytes of NVM 23 are needed during new public key N registration as compared to 320 additional bytes for the process of FIG. 2. It is thus readily apparent that the instant invention delays the generation of certain CRT parameters that are required for digital signature generation during the process of new key registration. This reduces the amount of dedicated NVM 23 resources that are needed during the new public key generation process and frees up NVM 23 resources for other uses.

As previously discussed, the CRT is used to optimize calculations when using the RSA algorithm. However, it does not have to be used. Rather, the newly generated public key D can be used to create the required digital signature. This saves NVM space requirements but at the cost of either 1) using a bigger cryptographic coprocessor to get the same performance or 2) slower performance. The use of the public key D in lieu of CRT would apply the inventive principles as follows:

1—Generate and store P and Q
2—Calculate the Public Key N and register it with the CA 3—Receive notification of registration from the CA 3—Subsequent to notification generate the Private Key D 4—After Private Key D generation discard P and Q 5—Use D to generate digital signature While the present invention has been disclosed and described with reference to a single embodiment thereof, it will be apparent, as noted above that variations and modifications may be made therein. It is thus intended in the following claims to cover each variation and modification that falls within the true spirit and scope of the present invention. For example, one skilled in the art would realize that the inventive technique can be extended to other cryptographic algorithms, particularly those that use precalculation techniques (similar to CRT) to improve performance. Additionally, while the preferred embodiment has been described in connection with a postage metering system its concepts are applicable in any transaction evidencing device where keys must be changed and registered on a periodic basis.

What is claimed is:

1. A method for using cryptographic parameters in a postage meter for securing postage indicium data, the method comprising the steps of:

generating in the postage meter 1) first cryptographic parameters which are useable in conjunction with second cryptographic parameters by the postage meter to cryptographically secure postage indicium data and 2) a cryptographic key;

storing the first cryptographic parameters but not the second cryptographic parameters in the postage meter during the registering of the cryptographic key with a certificate authority;

receiving at the postage meter notification that the cryptographic key has been registered with the certificate authority;

subsequent to receiving the notification generating and storing the second cryptographic parameters in the postage meter such that the first and second cryptographic parameters are stored in the postage meter for use in cryptographically securing postage indicium data.

2. A method as recited in claim 1, further comprising storing third cryptographic parameters in the postage meter which are used by the postage meter in securing postage indicium data during operation of the postage meter prior to receiving the notification.

3. A method as recited in claim 2, further comprising discarding the third cryptographic parameters and using the first and second cryptographic parameters to cryptographically secure postage indicium data subsequent to receiving the notification.

4. A method as recited in claim 3 wherein the first and second cryptographic parameters are Chinese Remainder Theorem parameters.

5. A method for using cryptographic parameters in a postage meter for securing postage indicium data, the method comprising the steps of:

generating in the postage meter first cryptographic parameters which are associated with a second cryptographic parameter and a cryptographic key;

storing the first cryptographic parameters but not the second cryptographic parameter in the postage meter during the registering of the cryptographic key with a certificate authority;

receiving at the postage meter notification that the cryptographic key has been registered with the certificate authority;

subsequent to receiving the notification generating in the postage meter the second cryptographic parameter based on the first cryptographic parameters, storing the second cryptographic parameter in the postage meter, discarding the first cryptographic parameters, and using the second cryptographic parameter for cryptographically securing postage indicium data.

6. A method as recited in claim 5, storing third cryptographic parameters in the postage meter which are used by the postage meter in securing postage indicium data during operation of the postage meter prior to receiving the notification.

7. A transaction evidencing device comprising:

A cryptographic engine that generates in the transaction evidencing device 1) first cryptographic parameters which are useable in conjunction with second cryptographic parameters by the transaction evidencing device to cryptographically secure postage indicium data and 2) a cryptographic key;

memory in which the first cryptographic parameters but not the second cryptographic parameters are stored in the transaction evidencing device during the registering of the cryptographic key with a certificate authority;

means for sending the cryptographic key to the certificate authority for registration; and means for receiving at the transaction evidencing device notification that the cryptographic key has been registered with the certificate authority; and means for, subsequent to receiving the notification, generating and storing the second cryptographic parameters in the transaction evidencing device such that the first and second cryptographic parameters are stored in the transaction evidencing device for use in cryptographically securing postage indicium data.

8. A transaction evidencing device as recited in claim 7, wherein third cryptographic parameters are stored in the transaction evidencing device, the third cryptographic parameters used by the transaction evidencing device in securing postage indicium data during operation of the transaction evidencing device prior to receiving the notification.

* * * * *